May 23, 1961 E. TACCOLINI 2,985,350
REMOVABLE CAR TOP CARRIER
Filed Nov. 6, 1958
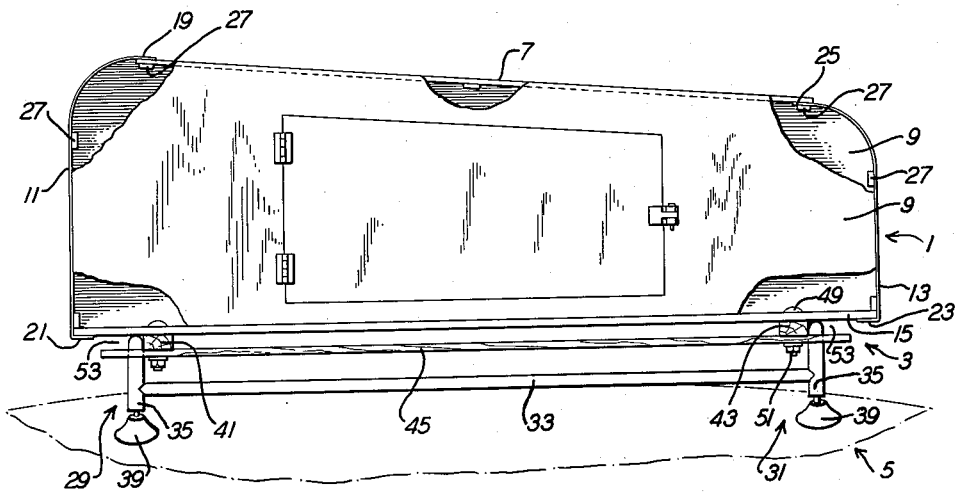
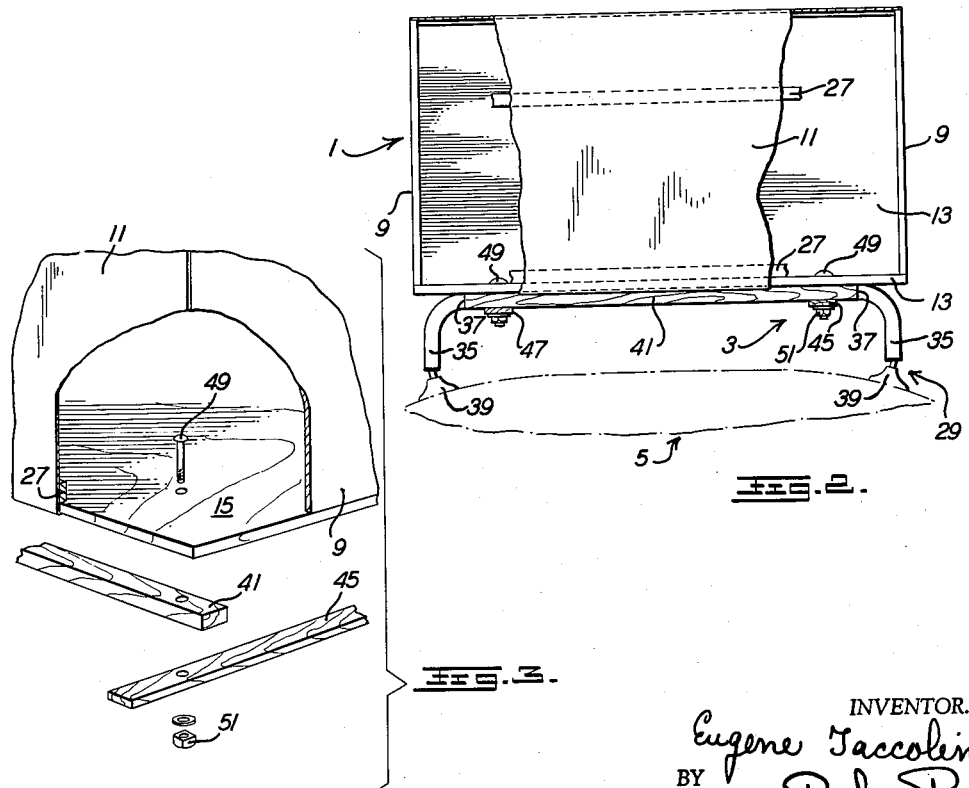
INVENTOR.
Eugene Taccolini
BY Peck & Peck
ATTORNEYS

United States Patent Office 2,985,350
Patented May 23, 1961

2,985,350
REMOVABLE CAR TOP CARRIER
Eugene Taccolini, Au Gres, Mich.
Filed Nov. 6, 1958, Ser. No. 772,330
2 Claims. (Cl. 224—42.1)

This invention relates broadly to the art of carriers adapted to be mounted on the top of a vehicle and in its more specific aspects it relates to an enclosed carrier and the means for removably mounting it on a vehicle top; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

An increasing number of persons are traveling by motor vehicle over relatively long distances and must carry a substantial amount of luggage and/or other equipment of various types. The storage of such equipment inside of the vehicle has presented a difficult problem and it has now become quite customary to carry such excess equipment on the roof or top of the vehicle. Many mounting expedients have been tried, but to the best of my knowledge, no arrangement heretofore used has been completely satisfactory.

Auxiliary carriers may also be used on various types of trucks as well as on passenger vehicles and it is within my contemplation to use my carrier on the top of any type of vehicle.

It will be appreciated that it is desirable to provide a carrier which is enclosed in order to protect the contained articles from the weather and from theft. A carrier which is useful must be of relatively large size so as to hold a useful load. The majority of those using roof or top mounted carriers do not use them at all times, and thus must position and securely mount them on the vehicle top and then remove them when they are not being used. It is therefore highly desirable to provide for ease of mounting and dismounting without sacrificing sure and secure attachment of the carrier to the vehicle top.

It will be recognized that it is desirable to provide a carrier which, while being of sturdy construction, is of light weight. The carrier of this invention meets these requirements and will provide adequate protection for the goods stored in it.

I have provided a carrier which may be removably fastened to the conventional car top rack which is mounted on the vehicle top and is usable on any type and size of car top rack and may be used on all types and makes of cars.

While I have illustrated an enclosed carrier it is to be understood that my mounting means may be used with open carriers or with any type of container adapted for mounting on a car top rack on the roof of a vehicle.

Conventional car top racks usually comprise front and rear sections which are removably mounted on the vehicle top and it is not easy to effect the mounting, and as far as I am aware, no simple way has been found for securely and removably mounting an article carrier on the car top rack. It is therefore an object of my invention to provide means for securely mounting a carrier on a car top rack in such manner that the carrier and the car top rack may be removed as a unit from the vehicle top.

It is a further object of my invention to provide an arrangement for mounting a carrier on a car top rack which permits the separation of the carrier from the rack in the event it is desired to use the latter without the former.

The mounting organization and arrangement which I have evolved is carried on the carrier for holding and mounting engagement with the car top rack so as to securely fasten the carrier thereto. In accomplishing this mounting I use no screws, bolts, straps or the like for fastening the carrier to the car top rack, instead the mounting is obtained by a novel relative positioning of mounting elements on the carrier with respect to the car top rack so that the carrier is restrained against movement relative to the rack.

I have devised an organization which simplifies and expedites the mounting of a carrier on top of a vehicle and securely fastens it in position. My organization may be assembled without requiring any special skills or tools and the components thereof are simple, sturdy and inexpensive. The removal of the carrier may also be easily and quickly accomplished.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a side view in elevation illustrating the carrier in mounted position on a vehicle top, parts of the carrier being broken away.

Fig. 2 is a front view in elevation illustrating the carrier in mounted position on a vehicle top, parts of the carrier being broken away.

Fig. 3 is an end view of the carrier with parts thereof being broken away and illustrating the transverse and longitudinal connecting members separated from each other and from the carrier.

In the accompanying drawings I have used the numeral 1 to designate the carrier in its entirety, the numeral 3 to. designate the mounting means in its entirety and the numeral 5 to generally designate the vehicle top upon which the carrier is removably mounted.

The carrier 1 comprises a top wall 7, side walls 9, a front wall 11 and a rear wall 13 and a bottom 15. If desired the carrier may be of streamlined configuration having the front wall of somewhat greater height than the rear wall and the top sloping downwardly from front to rear. The curb side of the carrier may be provided with any suitable type of access door 17.

The sides 9 and base or bottom may be formed of plywood or any suitable type of material having the necessary strength characteristics while the front 11 and rear 13 are preferably formed of light gauge metal which may be screwed or otherwise affixed to the sides, the front being bent so as to overlap the top as at 19 and the bottom as at 21 while the rear wall 13 overlaps the base or bottom as at 23 and extends under the top as at 25, the lapping parts being affixed together in any suitable manner. Any suitable number of reinforcing cross pieces 27 may be nailed and glued to the parts of the carrier in order to maintain the parts in assembled position.

It will be appreciated that the carrier 1 may be constructed in a number of ways and still be mounted on the car top rack by the ingenious means about to be described.

As one example from among many of a car top rack which may be used as a support for the carrier I have illustrated one comprising a front section and a rear section designated generally by the numerals 29 and 31, respectively. These sections may be connected and strengthened by longitudinal bars 33 (one being shown) which extend along the sides and between and connected to the sections. Each section consists of a pair of transversely spaced legs 35 connected at their upper ends by a transverse member 37. The sections may be mounted on the top of the vehicle by suction cups 39 and by any other suitable means, all in a well known and conventional manner.

It will be understood that the sections of the car top rack are spaced longitudinally approximately the length of the vehicle top and transversely approximately the width of the top. The car top rack sections may be kept on the vehicle top at all times or may be removed when the carrier 1 is removed. The longitudinal connecting bars 33 extend between and are connected to the legs 35 of the front and rear sections of the car top rack.

The means for securely mounting the carrier 1 to the car top rack comprises a pair of what I shall term "transverse holding and abutting elements," which provide a forward transverse holding element 41 and a rear transverse holding element 43. These holding elements preferably are elongated wood elements which may be of less length than the width of the carrier 1. The thickness of the transverse holding and abutting elements is approximately the same as the diameter of the transverse members 37 of the car top rack sections, for a purpose to be hereinafter explained. The mounting means also includes a pair of what I shall term "longitudinal holding and abutting elements" which provide a curbside longitudinal holding and abutting element 45 and a further longitudinal holding and abutting element 47 transversely spaced from the element 45.

In mounting the carrier 1 on the car top rack sections 29 and 31 the carrier is placed on the sections as shown in Fig. 1 with the carrier base supported on the transverse member 37 of the car top sections.

The transverse holding and abutting elements 41 and 43 may then be fixed to the base 15 of the carrier 1 to extend transversely thereacross. The elements are fixed to the carrier base by means of bolts 49 and nuts 51, and the elements are positioned on the carrier with respect to the car top rack sections so that when the carrier is positioned on the sections, as described, the front element 41 will be positioned to the rear of the transverse member 37 of section 29 with the front edge of element 41 in abutting relation with member 37 while the rear element 43 will be positioned forwardly of the transverse member 37 of section 31 with the rear edge of element 43 in abutting relation with member 37.

The longitudinal holding and abutting elements 45 and 47 are then operatively positioned in the mounting organization. Each of these longitudinal elements is of greater length than the distance between sections 29 and 31 and are positioned so that each end portion thereof extends under transverse members 37 and somewhat therebeyond and each element 45 and 47 is fastened to the underside of elements 41 and 43 by the bolts and nuts 49 and 51, respectively. The bolts and nuts upon being tightened draw elements 45 and 47 upwardly and tight against the under surfaces of transverse members 37 of the car top rack sections. It will, of course, be understood that the base of the carrier is drilled adjacent its four corners for receiving the bolts and nuts so that there will be four locations where the carrier is anchored to the car top rack. Also the elements 41—47 will be drilled at the proper locations so that they will be accurately incorporated in the organization.

It will now be appreciated that the transverse and longitudinal holding and abutting elements mount the carrier on the car top rack by means of the engagement of the elements with the parts of the car top rack and that this is a free engagement in that no connecting or affixing means between the elements and the car top rack are required.

Now it will be apparent that with the elements 41—47 affixed to the carrier as described the transverse members 37 of the car top rack sections will be received in the four areas 53 adjacent the corners of the carrier, these areas being defined by the base 15 of the carrier, the transverse holding and abutting elements 41 and 43 and the longitudinal holding and abutting elements 45 and 47. Forward movement of the carrier relative to the vehicle top and the car top rack will be prevented by the forward element 41 which abuts against the rear surface of forward transverse member 37 while rearward movement of the carrier will be prevented by the rear element 43 which abuts against the forward surface of rear transverse member 37. Upward movement of the carrier will be prevented since the longitudinal holding and abutting elements extend under both transverse members 37 and since the members 37 are clamped between base 15 and elements 45 and 47 lateral movement of the carrier will be prevented.

I claim:

1. A car top carrier including, in combination, a car top rack comprising a front section and a rear section spaced apart and removably fixed to the top of a vehicle and each section including a fixed transverse member spaced from the vehicle top, a carrier supported on said sections of the car top rack and said carrier having a base, front and rear transverse holding and abutting elements spacedly fixed to the underside of said base, the front transverse holding and abutting element being in engagement with the rear surface of the transverse member of said front section and the rear transverse holding and abutting element being in engagement with the forward surface of the transverse member of said rear section to prevent forward and rearward movement of said carrier relative to said sections, first means fixed to and extending between said transverse holding and abutting elements and extending beneath and beyond said transverse fixed members in spaced relation to said base and between said transverse fixed members and the vehicle top, and further means connected to said base, said transverse holding and abutting elements and said first means for clamping said transverse fixed members between said base and said first means.

2. A car top carrier including, in combination, a car top rack comprising a front and a rear section spaced apart and removably fixed to the top of a vehicle and each section including a fixed transverse member spaced from the vehicle top, a carrier supported on said sections of the car top rack, front and rear holding and abutting elements spacedly fixed to the underside of said carrier and extending transversely thereacross, the front transverse holding and abutting element being in engagement with the rear surface of the transverse member of said front section and the rear transverse holding and abutting element being in engagement with the forward surface of the transverse member of said rear section to prevent forward and rearward movement of said carrier relative to said section, and means spacedly connected to and extending between said front and rear holding and abutting elements and a portion of said means extended beneath and beyond each of said elements and between said transverse members and the vehicle top to prevent upward movement of said carrier relative to said sections, and said means extending substantially perpendicular with respect to said transverse members.

(References on following page)

References Cited in the file of this patent

UNITED STATES PATENTS

| | | |
|---|---|---|
| 1,720,073 | Freling | July 9, 1929 |
| 1,804,868 | Gage | May 12, 1931 |
| 1,876,758 | Romine | Sept. 13, 1932 |
| 2,622,918 | Staffe | Dec. 23, 1952 |
| 2,805,014 | Oslund | Sept. 3, 1957 |

FOREIGN PATENTS

| | | |
|---|---|---|
| 63,530 | France | Apr. 13, 1955 |
| 230,960 | Great Britain | Mar. 26, 1925 |